United States Patent
Zatloukal et al.

(10) Patent No.: US 8,838,183 B2
(45) Date of Patent: Sep. 16, 2014

(54) MOBILE DIGITAL COMMUNICATION/COMPUTING DEVICE HAVING A CONTEXT SENSITIVE AUDIO SYSTEM

(75) Inventors: Peter Zatloukal, Kirkland, WA (US); G. Eric Engstrom, Kirkland, WA (US)

(73) Assignee: Varia Holdings LLC, Brooklyn, NY (US)

( * ) Notice: Subject to any disclaimer, the term of this patent is extended or adjusted under 35 U.S.C. 154(b) by 1631 days.

(21) Appl. No.: 10/531,162

(22) PCT Filed: Oct. 14, 2003

(86) PCT No.: PCT/US03/32776
§ 371 (c)(1),
(2), (4) Date: Apr. 12, 2005

(87) PCT Pub. No.: WO2004/036367
PCT Pub. Date: Apr. 29, 2004

(65) Prior Publication Data
US 2006/0094474 A1     May 4, 2006

Related U.S. Application Data

(60) Provisional application No. 60/418,920, filed on Oct. 15, 2002.

(51) Int. Cl.
*H04M 1/00*     (2006.01)
*H04B 1/38*     (2006.01)
*G06F 15/16*     (2006.01)
*H04M 1/60*     (2006.01)
*H04M 1/725*     (2006.01)

(52) U.S. Cl.
CPC ........ *H04M 1/6016* (2013.01); *H04M 1/72558* (2013.01); *H04M 1/72522* (2013.01)
USPC ............ 455/567; 455/572; 709/201; 709/203

(58) Field of Classification Search
CPC .......... H04M 1/72558; H04M 1/6016; H04M 1/72522
USPC ............................ 709/201, 203; 455/572, 567
See application file for complete search history.

(56) References Cited

U.S. PATENT DOCUMENTS

| | | | |
|---|---|---|---|
| 5,910,996 A | 6/1999 | Eggers et al. | |
| 6,035,211 A * | 3/2000 | Rabe et al. | 455/567 |
| 6,298,247 B1 * | 10/2001 | Alperovich et al. | 455/558 |
| 6,351,653 B1 * | 2/2002 | Alberth et al. | 455/552.1 |
| 7,272,232 B1 * | 9/2007 | Donaldson et al. | 381/55 |
| 2004/0105538 A1 * | 6/2004 | Goebel | 379/387.01 |

* cited by examiner

*Primary Examiner* — Noel Beharry
*Assistant Examiner* — Farhad Ali
(74) *Attorney, Agent, or Firm* — Schwabe, Williamson & Wyatt, P.C.

(57) ABSTRACT

A mobile client device, such as a wireless mobile or a palm sized personal digital assistant, is provided with at least a first and second audio resources and companion programming instructions/circuitry to generate various audio signals in a more context sensitive manner, while multi-media resources are being utilized. The instructions/circuitry cause the mobile client device to determine a first audio volume level at which the mobile client device is being utilized by a user for a first audio signal. Once the first audio volume level is determined, instructions/circuitry cause a second audio signal to be provided at a second audio volume level to the user. The second audio volume level being based at least in part on the first audio volume level initially.

22 Claims, 5 Drawing Sheets

MOBILE DIGITAL COMMUNICATION/COMPUTING DEVICE HAVING A CONTEXT SENSITIVE AUDIO SYSTEM

RELATED APPLICATIONS

This non-provisional patent application claims priority to U.S. provisional patent application No. 60/418,920, entitled "A MOBILE DIGITAL COMMUNICATION/COMPUTING DEVICE HAVING A CONTEXT SENSITIVE AUDIO SYSTEM", filed on Oct. 15, 2002 and having common inventorship with the present application, which is hereby fully incorporated by reference.

FIELD OF INVENTION

The present invention relates to the fields of mobile communication and/or computing devices. More specifically, the present invention relates to delivery of audio on these devices.

BACKGROUND OF THE INVENTION

Advances in computer and telecommunication technology have led to wide spread adoption of mobile client devices, from the basic wireless telephones to function rich notebook sized computers that pack the power of a desktop computer. In between are web enabled wireless telephones, palm sized personal digital assistants (PDA) and so forth. As a result, multi-media contents are also becoming available and consumed through mobile client devices.

These multi-media contents include but are not limited to, movies, music, and so forth. An important aspect of utilization of multi-media contents is audio. For example, a mobile client device may include a multi-media resource such as an MP3 player or a radio (where rendering of the audio content often accompanied by displays of titles, stations, graphics and other visualizations of the like).

Utilization of multi-media resources such as MP3 player/radio requires utilization of the mobile client device's audio system, which is often a resource shared by many functions of the mobile client device. These audio system sharing functions include but are not limited to functions for delivering message alerts for the arrival of an incoming call, a text message and so forth. Thus, utilization of the audio system by the multi-media resources may cause interference and/or conflict with other resources/functions of the mobile client device.

For example, in the case of the mobile client device being a cell phone having multi-media resource capabilities, such as the MP3 player/radio, the playing of the music may interfere with the delivery of a message alert for an incoming call and vice versa. That is, the alert tone may be generated at a predetermined power level that was pre-selected by a user. However, when the MP3 player is being utilized, the pre-selected power level of the alert tone may be either too low or too high relative to the music being played, thereby causing either the alert tone being too low to be heard over the music or too high that it causes intrusive interference with the enjoyment of the music. What is worse is if the message alert is set to be delivered at a high volume to ensure that the user can hear it even in a noisy environment, and the user is employing a headset to enjoy the audio content. Delivery of the message alert at the preset high volume level may cause damage to the user's eardrum.

Among the modern mobile client devices, unquestionably, wireless mobile and palm sized computing devices have emerged as the two most popular mobile client devices to utilize these multi-media resources. Thus, a need exists for a more context sensitive way of notifying a user of an alert tone while an audio system is being utilized by multi-media resources.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

In the following description, various aspects of the present invention will be described by way of illustrative embodiments. However, it will be apparent to those skilled in the art other embodiments may be practiced with only some of the aspects. For purposes of explanation, specific numbers, materials, and configurations are set forth in order to provide a thorough understanding. However, it will also be apparent to one skilled in the art that other embodiments may be practiced without the specific details. In other instances, well known features are omitted or simplified in order not to obscure the illustrative embodiments.

Parts of the description will be presented using terms such as audio, alert, volume, and so forth, commonly employed by those skilled in the art to convey the substance of their work to others skilled in the art. Parts of the description will be presented in terms of operations performed by a computing device, using terms such as sensing, generating, mixing, and so forth. As well understood by those skilled in the art, these quantities and operations take the form of electrical, magnetic, or optical signals capable of being stored, transferred, combined, and otherwise manipulated through mechanical and electrical components of the "host" mobile device.

Various operations will be described in turn in a manner that is most helpful in understanding the present invention, however, the order of description should not be construed as to imply that these operations are necessarily order dependent. Furthermore, the phrase "in one embodiment" will be used repeatedly, however the phrase does not necessarily refer to the same embodiment, although it may. The terms "comprising", "having", "including" are synonymous, unless the context requires otherwise.

Figure 1:
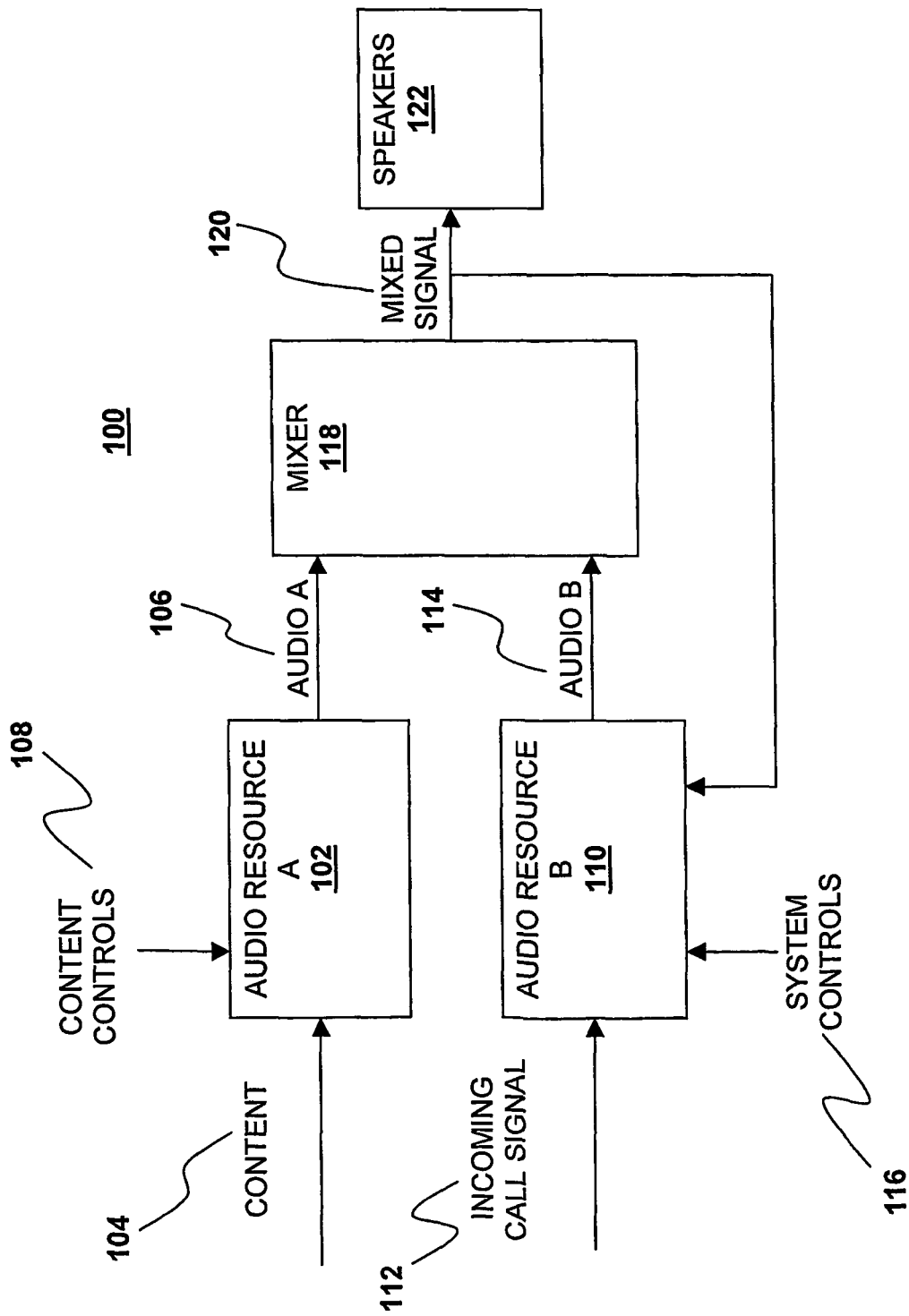
FIG. 1 illustrates an overview of the present invention, in the context of an exemplary audio system, in accordance with one embodiment.

FIG. 1 illustrates an overview of the present invention, in the context of an exemplary audio system, in accordance with one embodiment. Exemplary audio system 100 may be a component of a mobile client device, for example, a wireless mobile phone. As shown, audio system 100 receives electronic signals from various signal processing and control facilities of the mobile client device, and processes the received electronic signals appropriately, including responsively generating audio signals and mixing them, before providing them to the speakers.

As illustrated in FIG. 1, for the embodiment, exemplary audio system 100 includes a first audio resource 102 that receives/retrieves audio content 104, and generates a first audio signal 106 at a first audio volume. For example, first audio resource 102 may read audio content from a non-volatile memory 206 (shown in FIG. 2) in the case of an MP3 player, or receive audio content from an antenna 412 & 428 in the case of a radio, and generates music in response. Audio content controls 108 such as title/track of music, radio station, audio volume, and so forth, may also be received by the first audio resource 102 facilitating desired utilization of the audio resource by a user (not shown). That is, the user may have set the audio volume level of the audio signal associated with the MP3 player to a user desired audio volume level, and accordingly, first audio resource 102 provides the first audio signal 106 associated with the utilization of the MP3 at the user desired first audio volume level.

In FIG. 1, audio system 100 also includes a second audio resource 110 that likewise, receives a delivery of a message alert 112, and generates a second audio signal 114 for the message alert at a second audio volume. For example, second audio resource 110 receives a delivery of a message alert for an incoming call 112, and generates a second audio signal 114 in the form of a ring tone. System controls 116 such as various ring tones, audio volume increments, audio volume, and so forth, may also be received by the second audio resource 110 from the non-volatile memory 206 (shown in FIG. 2), and the generation of the ring tone is controlled accordingly.

Additionally, in FIG. 1, the audio system 100 includes a mixer 118 to receive the first and second audio signals 106 & 114 to be mixed and provided to speakers 122 in the form of a mixed audio signal 120. Speakers 122 responsively render mixed audio signal 120 as sound for the user.

Additionally, as shown in FIG. 1, in accordance with one aspect of the present invention, the second audio resource 110 advantageously further controls its audio volume based at least in part on the current state of mixed audio signal 120. In one embodiment, second audio resource 110 is equipped to determine a first audio volume level at which the mobile client device is being utilized by the user for the first audio signal 106 (i.e., the volume mixed audio signal 120), and then, provide the second audio signal 114 at a second audio volume level to the user. The second audio volume level is based at least in part on the first audio volume of the first audio signal 106.

Referring to the previous example of the MP3 player and the incoming call, in accordance with one aspect of the present invention, second audio resource 110 provides a ring tone associated with an alert for the incoming call 112 at an audio volume level that is based at least in part on the audio volume level at which the MP3 player is being played. Having a second audio signal 114 at a volume level based at least in part on a first volume level of a first audio signal 106 advantageously provides for a more context sensitive way of notifying a user of an alert tone while an audio system is being utilized for multi-media resources, thereby avoiding poor usability problems such as ringing at a too low volume level or ringing at a too high volume level into the user's ears.

Before proceeding to further describe other aspects of the present invention, it should be noted while for ease of explanation, the remaining descriptions are presented primarily in the context mobile client devices, however, based on the description to follow, a person skilled in the art will appreciate that the present invention may be adapted for other applications besides mobile client devices.

Additionally, for ease of understanding, audio signals are presented in terms of music and ring tones. However, based on the description to follow, it should be appreciated that the audio signals may be in any number of forms, e.g., music and voice (including but not limited to intercom functionality that may be found in some mobile client devices). Accordingly, the present invention will not be redundantly re-described for all the various available audio signals.

Audio resources 102 & 110, and mixer 118 may be implemented in software and/or hardware. For example, if audio resources 102 & 110 are implemented as software, while having mixer 118 implemented as hardware, an audio signal device driver and a digital to analogue converter (DAC) (both not shown) may be disposed between the audio resources 102 & 110 and mixer 118. Similarly, if mixer 118 is implemented as software, an audio device driver and a DAC may be disposed between mixer 118 and speakers 122. Inclusion of audio signal devices and DACs for various implementations of the present invention are within the ability of those skilled in the art, accordingly, will not be described in further details.

Continuing to refer to FIG. 1, in various embodiments, second audio resource 110 is equipped to cause the second audio signal 114 to be delivered at a second audio volume level that is substantially the same as the first audio volume level of the first audio signal 106 at which the mobile client device is being utilized. Moreover, second audio resource 110 is equipped to cause the second audio signal 114 to be at a second audio volume that advantageously provides for a more context sensitive way of notifying a user of an alert tone while an audio system is being utilized for multi/single-media resources.

In various embodiments, second audio resource 110 is equipped to variably control the second audio volume level of the second audio signal 106. That is, for these embodiments, starting from an audio volume level based at least in part on the first audio volume level of the first audio signal 106, the second audio volume level is gradually increased in predetermined increments to eventually reach an upper limit of an audio volume level. Preferably, the predetermined increments may be system dependent based on the type of mobile client device, to be more fully described below. Alternatively, the predetermined increments are configurable by the user. As previously described, system controls 116 may include the predetermined increments.

In various embodiments, second audio resource 110 is equipped to determine audio volume levels as audio power levels, such as, but not limited to, audio power levels measured in at least one of volts, watts, and decibels.

In various embodiments, second audio resource 110 is equipped to determine if audio signals are being utilized in the mobile client device, and to provide a second audio signal at a second audio volume if the audio signals are being utilized.

In various embodiments, second audio resource 110 is equipped to compare the second audio volume level of the second audio signal 114 with the first audio volume level of the first audio signal 106 before being providing the second audio signal 114 at the second audio volume.

Audio resources 102 & 110 may generate any one of a number of audio signal utilized in audio systems that receive electrical signal and generates corresponding audio signals having frequencies within the audio range which may be between 15-20000 Hz (i.e., audio signals). Additionally, audio resources 102 & 110 may include any one of a number of audio volume controllers utilized to boost the power level of an audio signal to drive a speaker, such as, an amplifier (i.e., for various audio volume levels).

Mixer 118 may be any one of a number of audio signal mixers utilized in audio systems to mix various audio signals. Mixers are well within the ability of those skilled in the art, accordingly, will not be described in further details.

Except for second audio resource 110 being equipped to facilitate a more context sensitive way of notifying a user of an alert tone while an audio system is being utilized for multi/single-media resources, the functions and constitutions of the various enumerated components of FIG. 1 are known in the art, accordingly will not be otherwise further described. Additionally, for ease of understanding the present invention, various components that may also be included in the audio system 100, such as, but not limited to, pre-amplifiers, differential amplifiers, and so forth, are not shown.

Figure 2:
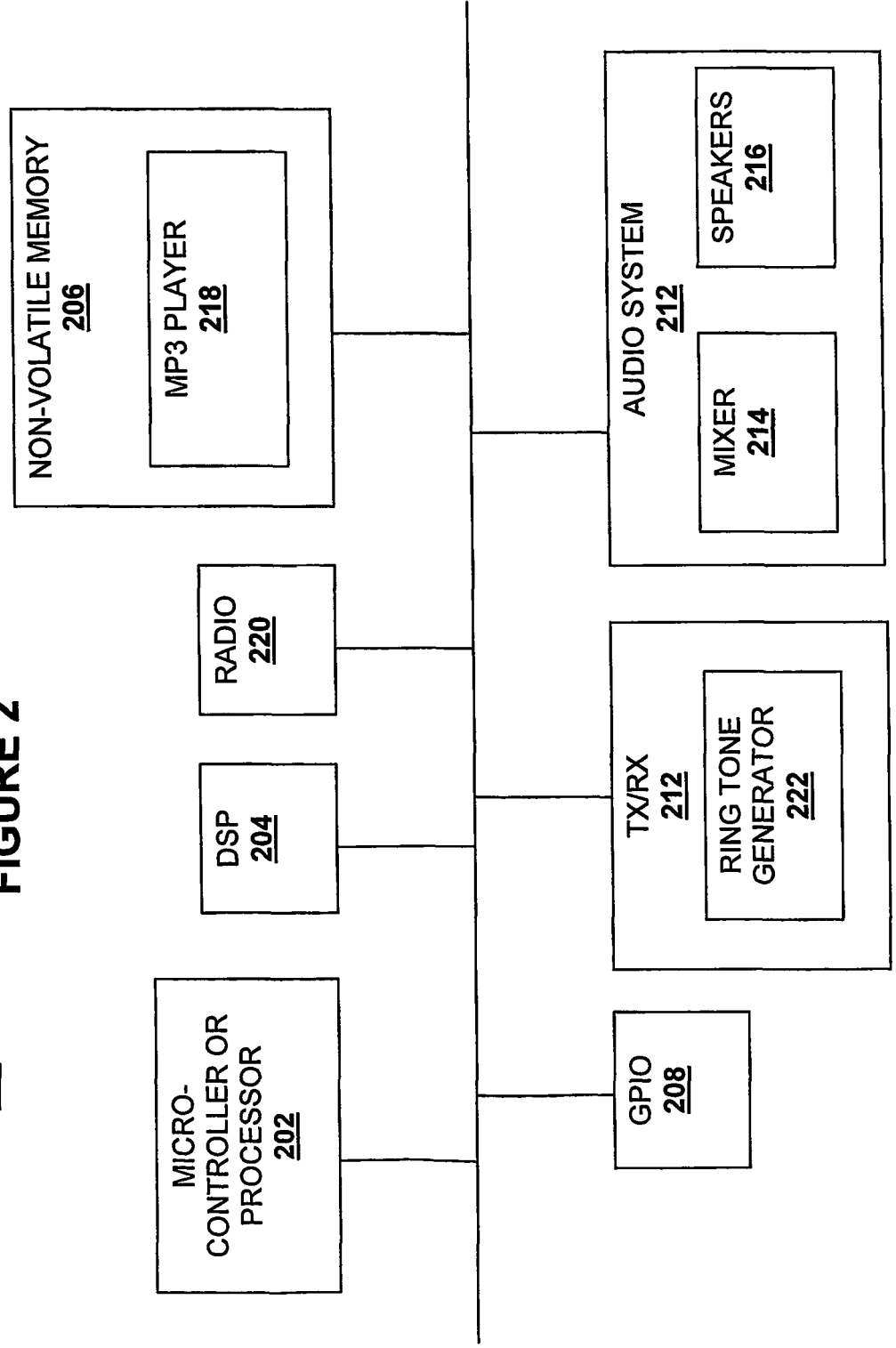
FIG. 2 illustrates an architectural view of a mobile client device, which is representative of mobile phone, incorporating teachings of the present invention.

FIG. 2 illustrates an architectural view of a mobile client device 200, which is intended to be representative of mobile phone 400 and PDA 420 (shown in FIGS. 4A & 4B), incorporating teachings of the present invention. As illustrated, mobile client device 200 includes elements found in conventional mobile client devices, such as micro-controller/processor 202, digital signal processor (DSP) 204, non-volatile memory 206, general purpose input/output (GPIO) interface 208, and transmit/receive (TX/RX) 210. For the illustrated embodiment, mobile client device 200 is also advantageously provided with audio system 212 (representative of earlier described audio system 100 shown in FIG. 1) having mixer 214 and speakers 216 (representative of earlier mixer 118 and speakers 122 both shown in FIG. 1).

In the illustrated embodiment of FIG. 2, a first audio resource may be an MP3 player. Accordingly, in FIG. 2, non-volatile memory 206 includes instructions in the form of an MP3 player 218 to be executed by the micro-controller or processor 202. Utilization of the MP3 player 218 provides a first audio signal in the form of music at a first audio volume level. Additionally, mobile client device 200 may also include a radio 220 that provides the audio signal. That is, mobile client device 200 may have one or more multi-media resources. Utilization of multi-media resources 220 & 218 are well within the ability of those skilled in the art, accordingly, it is not further described.

In FIG. 2, TX/RX 210 includes a second audio resource in the form of a ring tone generator 222 to receive a delivery of a message alert, and in response, generates a ring tone. Accordingly, ring tone generator 222 provides a second audio signal in the form of a ring tone at a second audio volume level. In accordance with the teachings of the present invention, ring tone generator 222 is equipped to provide the second audio signal at a second audio volume level that is based at least in part on the first audio volume level of the first audio signal.

As a result, a second audio signal is advantageously provided to the user in a context sensitive manner, while multi/single-media resource(s) of the mobile client device is/are being utilized for a different audio signal.

Figure 3A:
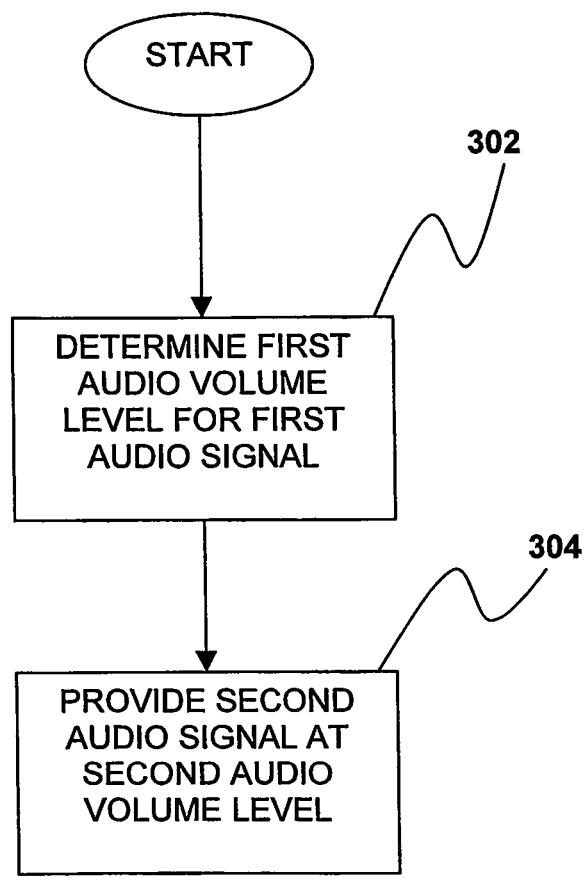
FIGS. 3A-3B illustrate the operational flow of the relevant aspects of second audio resource, an example of which may be a ring tone generator, in accordance with one embodiment of the present invention.
Figure 3B:
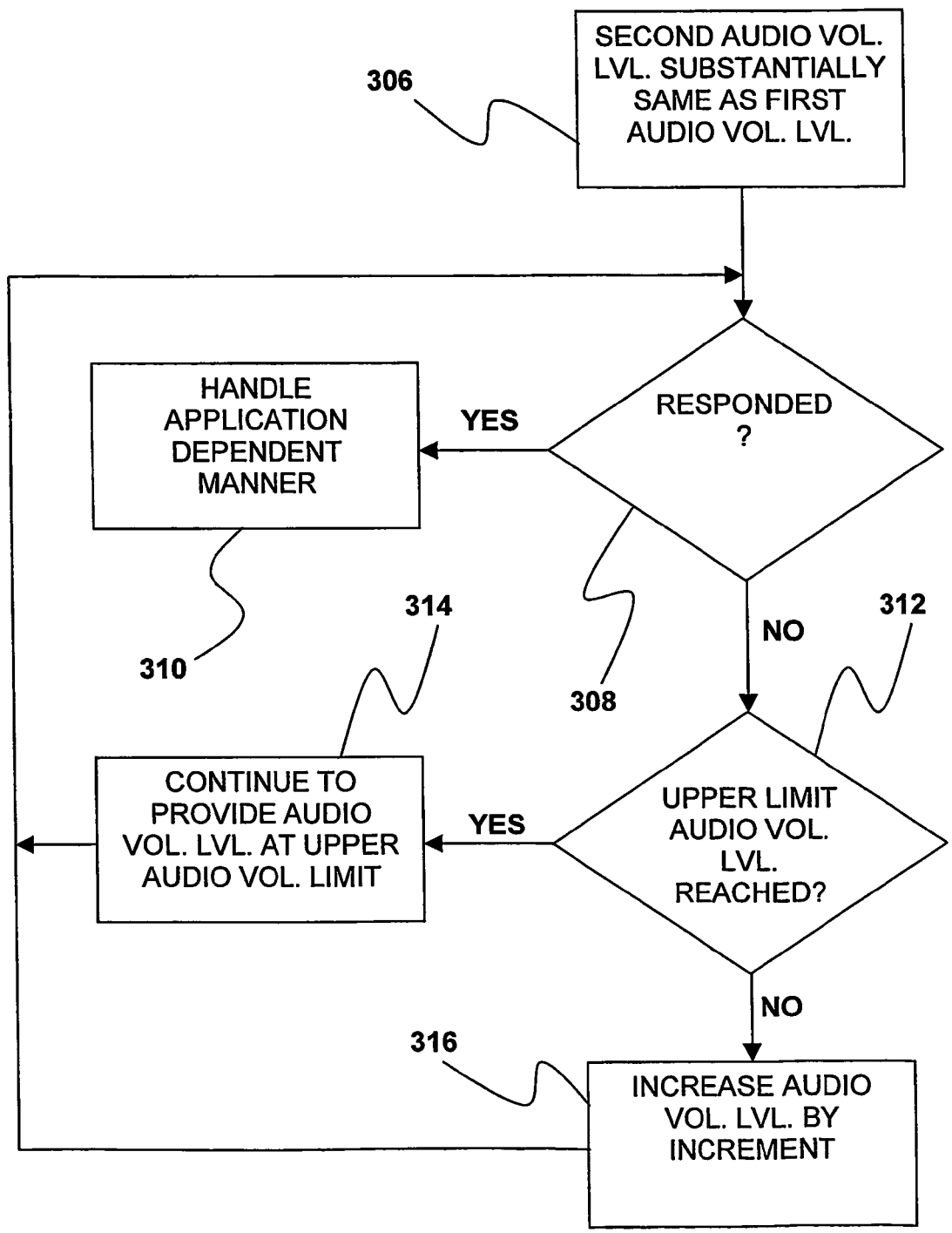

FIGS. 3A-3B illustrate the operational flow of the relevant aspects of second audio resource 110 (shown in FIG. 1) an example of which may be the ring tone generator 222 (shown in FIG. 2), in accordance with one embodiment of the present invention. As previously alluded to, it will be appreciated by those skilled in the art, based on the description to follow, in practice, second audio resource 110 may be implemented in hardware, e.g., through ASIC, or in software, executed e.g., by an embedded controller.

As illustrated in FIG. 3A, on initialization, e.g., upon receiving a delivery of a message alert 112, second audio resource 110 determines the first audio volume level at which a wireless mobile phone is being utilized by a user for a first audio signal, block 302. In various embodiments, the first audio signal is associated with music, e.g., an MP3 player, a radio, and so forth. Accordingly, for at least some of these embodiments, second audio resource 110 determines the first audio volume level at which music is being played by the wireless mobile phone.

Thereafter, second audio resource 110 provides the second audio signal at a second audio volume level to the user, block 304. The second audio volume level is based at least in part on the first audio volume level. In various embodiments, the second audio signal is associated with ring tones for system alerts, e.g., an incoming call. Accordingly, for at least some of these embodiments, second audio resource 110 provides a ring tone to the user at an audio volume level that is based at least in part on the audio volume level that the music is being played.

Referring now to FIG. 3B, one embodiment for providing a second audio signal to the user at a second audio volume level is described in more detail. As previously described, in various embodiments, the second audio volume level may be substantially identical to the first audio volume level, block 306. That is, for the embodiment described, the ring tone is provided to the user at an audio volume level that is substantially same as the audio volume level of the music being played.

In various embodiments, the second audio volume level is gradually increased in predetermined increments to an upper limit audio volume level. Accordingly, for at least these embodiments, second audio resource 110 determines whether the provided second audio signal is responded to by the user, block 308. The user may respond to the second audio signal in any one of a variety of manners, e.g., by pressing a button to receive the incoming call. If it is determined that the user has responded to the second audio signal, the response is handled in an application dependent manner (i.e., answer the incoming call), at 310. Preferably, once the user responds to the second audio signal, the second audio resource 110 turns off the first audio signal so as not to interfere with the application associated with the second audio signal.

If the user does not respond to the second audio signal, second audio resource 110 determines if an upper limit of the audio volume level has been reached, block 312. The upper limit of the audio volume may be based at least in part on a mobile phone's maximum volume level, e.g., a volume level of "10". If the upper limit of the audio volume level has been reached, second audio resource 110 continues to provide the second audio signal at the upper limit of the audio volume level until the user does respond to the second audio signal or until other disposition criteria, such as the mobile client device responding with a no answer message, are met, at 314.

Back at block 310, if it is determined that the upper limit of the audio volume has not been reached, second audio resource 110 increases the second audio volume level of the second audio signal to by an increment, at block 316. Here again, the increment, by which the second audio volume level is increased, may be based at least in part on a particular mobile phone's system corresponding to incremental audio volume changes, e.g., the incremental audio volume increase for a change in the audio volume of the mobile phone from "1-2", "2-3", and so forth. Accordingly, for example, if the second audio volume level is 2 corresponding to the first audio volume level, the incremental audio volume increase may be 1 audio volume level resulting in the subsequent audio volume level being 3. This process is continued until the upper limit of the audio volume level is reached (i.e., audio volume level of 10).

As a result, a second audio signal is advantageously provided to a user in a context sensitive manner, while multi/single-media resource(s) of the mobile client device is/are being utilized by the user. Additionally, an audio volume level of the second audio signal is incrementally increased to facilitate a response from the user.

For ease of understanding the present invention, audio volume level is described in terms of alphanumeric variables. However, it should be appreciated that the audio volume level may be described in terms of any number of manners, such as, but not limited to, graphical representations of wafts, decibels, and so forth.

Figure 4B:
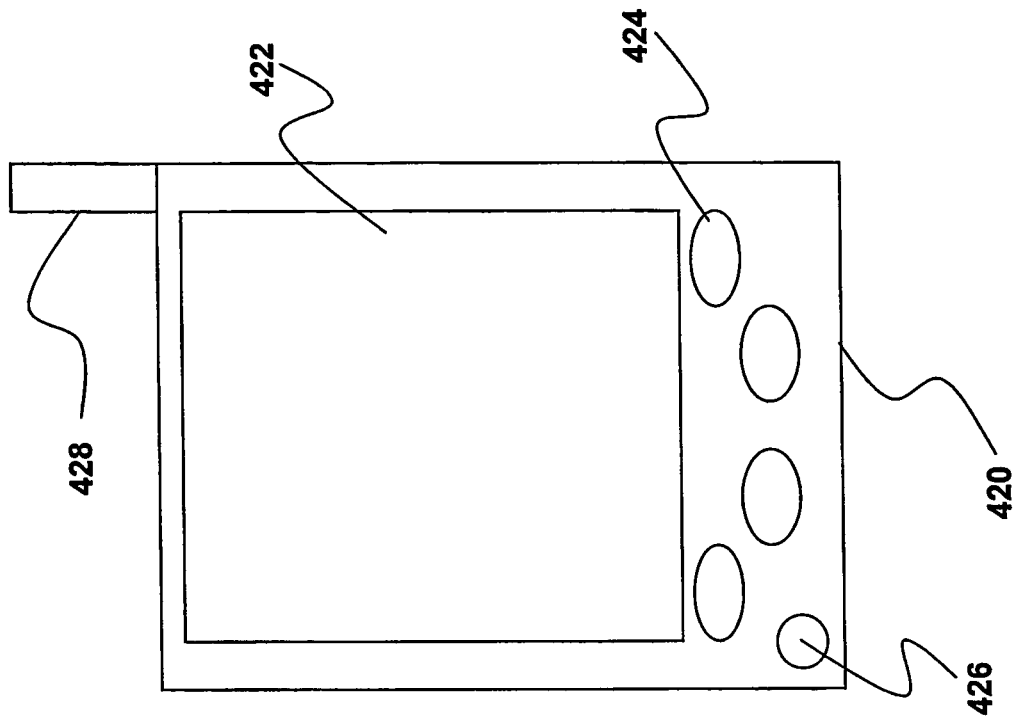
FIGS. 4A-4B illustrate exemplary applications of an audio system incorporated with the teachings of the present invention.
Figure 4A:
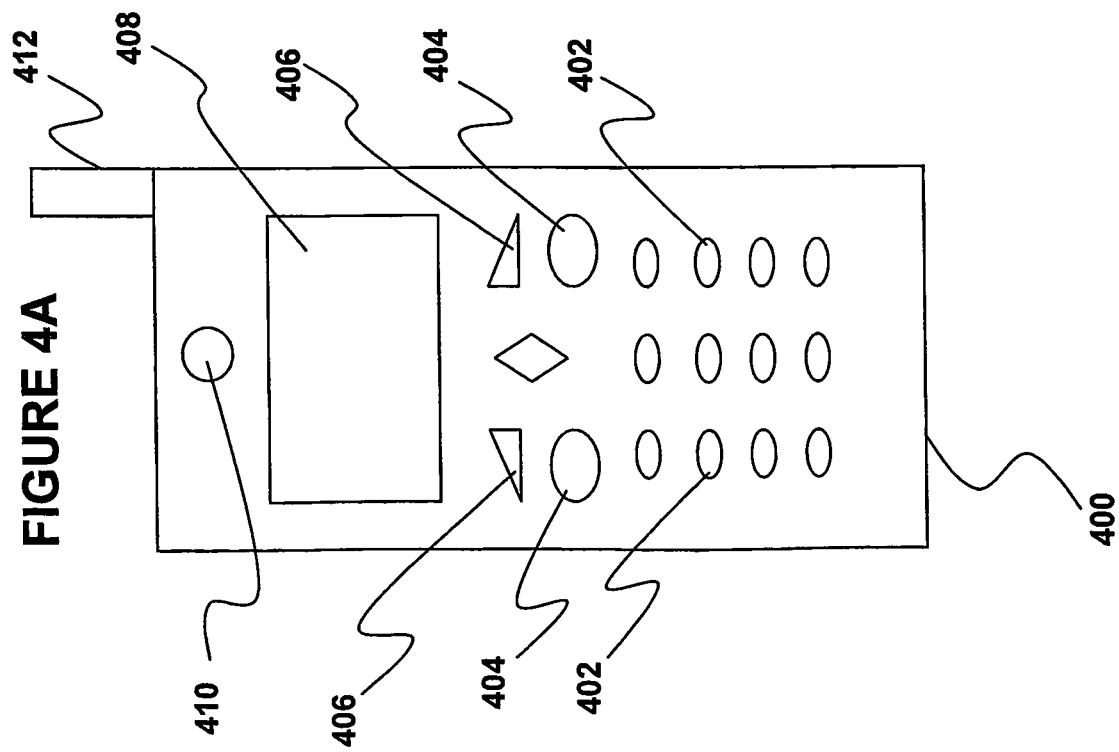

FIGS. 4A-4B illustrate exemplary application of audio system 100 & 212 of FIGS. 1 & 2 incorporated with the teachings of the present invention. Illustrated in FIG. 4A is a wireless mobile phone 400 incorporated with audio system 100 & 2 of FIGS. 1 & 2, which as described earlier, is equipped to provide an alert in a more context sensitive manner, in accordance with the teachings of the present invention.

As illustrated in FIG. 4A, similar to conventional wireless mobile phones, wireless mobile phone 400 includes key pad 402, "talk" and "end talk" buttons 404, cursor control buttons 406, display screen 408, speaker 410, and antenna 412. Additionally, wireless mobile phone 400 may include multi-media resources, e.g., MP3 player and radio that may be listened to by a user through speaker 410 or headphones (not shown). However, unlike prior art wireless mobile phones, wireless mobile phone 400 is provided with audio volume control logic 106 & 220 to advantageously provide various audio signals in a less intrusive manner, while these multi-media resources are being utilized.

Referring now to FIG. 4B, a palm sized PDA, incorporated with the teachings of the present invention, in accordance with various embodiments, is shown. As illustrated, similar to a conventional PDA, PDA 420 includes display screen 422, function buttons 424, speaker 426, and antenna 428. Similar to the wireless mobile phone 400, PDA 420 also may include multi-media resources, e.g., MP3 player and radio that may also be listened to by a user through speaker 426 or headphones (not shown). However, unlike prior art PDA, but similar to wireless mobile phone 400, PDA 420 is provided with second audio resource 110 that is equipped to advantageously provide various audio signals in a more context sensitive manner, while these multi-media resources are being utilized.

Accordingly, a mobile client device having integrated capabilities for providing various audio signals in a more context sensitive manner, while these multi-media resources are being utilized has been described. While the present invention has been described in terms of the above illustrated embodiments, those skilled in the art will recognize that the invention is not limited to the embodiments described. Thus, the description is to be regarded as illustrative instead of restrictive on the present invention.

What is claimed is:

1. In a mobile client device, a method of operation comprising:
    first providing, by the mobile client device, a first audio signal at a first audio volume level to a user, the first audio volume level being selectable by the user;
    determining by the mobile client device, the first audio volume level at which the first audio signal is being provided to the user by the mobile client device;
    while providing said first audio signal to the user at the first audio volume level, providing, by the mobile client device, to the user a second audio signal at a second audio volume level, the second audio volume level being variably controlled by the mobile client device based on said first audio volume level, the second audio volume level being non-intrusively lower than the first audio volume level initially; and
    while providing the first and second audio signals, incrementally increasing, by the mobile client device, the second audio volume level from the initial non-intrusive lower volume level to a discernable volume level higher than the first audio volume level, said incrementally increasing further comprising:
        first, increasing the second audio volume level by a first predetermined increment,
        second, determining that the user has not responded to the second audio signal, and
        third, increasing the second audio volume level by a second predetermined increment.

2. The method of claim 1, wherein said determining the first audio volume level comprises the mobile client device determining a first audio volume level at which the mobile client device is being utilized by a user for a first audio signal corresponding to music associated with output of at least one of an MP3 player and a radio included with the mobile client device.

3. The method of claim 1, wherein said second providing the second audio signal comprises the mobile client device providing the second audio signal corresponding to a ring tone associated alert for at least a selected one from the group consisting of an incoming call, a received indication of a text message, a received indication of a voicemail message, a calendar alert, and a wireless mobile phone system utilities warning.

4. The method of claim 1, wherein said incrementally increasing comprises incrementally increasing the second audio volume level to a pre-determined audio volume level limit above which hearing damage is likely to occur.

5. The method of claim 1, wherein said incrementally increasing comprises incrementally increasing the second audio volume level by a selected one of a constant increment and an increasing increment.

6. The method of claim 1, wherein said determining comprises the mobile client device determining the first audio volume level measured as an audio power level.

7. The method of claim 6, wherein said determining the first audio volume level comprises the mobile client device determining the first audio volume level measured as at least one of volts, watts, and decibels.

8. The method of claim 1, further comprising the mobile client device mixing said first and second audio signals and providing the first and second audio signals as a mixed signal, the second audio volume level being variably controlled by the mobile client device based at least in part on said mixed signal.

9. A wireless mobile phone comprising:
    a first hardware audio resource, the first hardware audio resource equipped to provide a first audio signal at a first audio volume level at which the mobile phone is being utilized by a user for the first audio signal, the first audio volume level being selectable by the user; and
    a second hardware audio resource, wherein the second hardware audio resource is equipped to
    determine the first audio volume level at which the first audio signal is being provided to the user by the first hardware audio resource,
    provide a second audio signal at a second audio volume level to the user while the mobile phone is being utilized by the user for the first audio signal at the first audio volume level, the second audio volume level being variably controlled by the second hardware audio resource based on said first audio volume level, the second audio volume level being non-intrusively lower than the first audio volume level initially, while the first and second audio signals are being provided, incrementally increase the second audio volume level from the initial non-intrusive volume level to a discernable volume level higher than the first audio volume level, the second hardware audio resource equipped to incrementally increase the second audio volume level by first, increasing the second audio volume level by a first predetermined increment, second, determining that the user has not responded to the second audio signal, and third, increasing the second audio volume level by a second predetermined increment, and terminate the second audio signal preventing the second audio signal from intruding on the first audio signal in response to a user action.

10. The wireless mobile phone of claim 9, wherein the first hardware audio resource comprises at least one of an MP3 player and a radio.

11. The wireless mobile phone of claim 9, wherein the second hardware audio resource comprises an audio resource equipped to receive a delivery of a message alert to the user.

12. The wireless mobile phone of claim 11, wherein the second hardware audio resource comprises a ring tone generator.

13. The wireless mobile phone of claim 11, wherein the second hardware audio resource is equipped to receive a delivery of a message alert for at least a selected one from the group consisting of an incoming call, a received indication of a text message, a received indication of a voicemail message, a calendar alert, and a wireless mobile phone system utilities warning.

14. The wireless mobile phone of claim 9, wherein the second hardware audio resource is equipped to incrementally increase the second audio volume level to a predetermined audio volume level limit above which hearing damage is likely to occur.

15. The wireless mobile phone of claim 9, wherein second hardware audio resource is equipped to incrementally increase the second audio volume level by a selected one of a constant increment and an increasing increment.

16. The wireless mobile phone of claim 9, wherein the first and second audio volume levels are measured as audio power levels.

17. The wireless mobile phone of claim 16, wherein the audio power levels are measured in at least one of volts, watts, and decibels.

18. The wireless mobile phone of claim 9, further comprising a mixer, the mixer equipped to mix the first and second audio signals, the second hardware audio resource being further equipped to variably control the second audio volume level based at least in part on the mixed signal.

19. A mobile client device comprising:

a non-transitory storage medium having stored therein a plurality of programming instructions, which when executed, the instructions cause the mobile client device to first provide a primary audio signal at a first audio volume level to a user, the primary audio volume level being selectable by the user, determine the primary audio volume level at which the primary audio signal is being provided to the user, and while said primary audio signal is being provided to the user at the first audio volume level, provide a secondary audio signal at a second audio volume level to the user, the second audio volume level being variably controlled by the mobile client device based on said first audio volume level, the second audio volume level being non-intrusively lower than the first audio volume level initially, and while the mobile client device provides the primary and secondary audio signals, incrementally increase the secondary audio volume level from the initial non-intrusive volume level to a discernable volume level higher than the first audio volume level by:

first, increasing the second audio volume level by a first predetermined increment, second, determining that the user has not responded to the second audio signal, and third, increasing the second audio volume level by a second predetermined increment; and a processor coupled to the storage medium to execute the programming instructions.

20. The mobile client device of claim 19, wherein the primary audio signal corresponds to music associated with output of at least one of an MP3 player and a radio included with the mobile client device.

21. The mobile client device of claim 19, wherein the secondary audio signal corresponds to a ring tone associated alert for at least a selected one from the group consisting of an incoming call, a received indication of a text message, a received indication of a voicemail message, a calendar alert, and a wireless mobile phone system utilities warning, and the programming instructions are further configured to terminate the secondary audio signal preventing the secondary audio signal from intruding on the primary audio signal in response to an user action.

22. The mobile client device of claim 19, wherein the primary audio volume level is measured as an audio power level.

* * * * *